United States Patent
Mehta et al.

(10) Patent No.: US 10,379,890 B1
(45) Date of Patent: Aug. 13, 2019

(54) SYNCHRONIZED CACHE OF AN OPERATIONAL STATE OF DISTRIBUTED SOFTWARE SYSTEM

(71) Applicant: Juniper Networks, Inc., Sunnyvale, CA (US)

(72) Inventors: Anish Mehta, Fremont, CA (US); Sundaresan Rajangam, Sunnyvale, CA (US); Rajashekar Reddy, San Jose, CA (US); Megh Bhatt, Dublin, CA (US); Tirthankar Ghose, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 270 days.

(21) Appl. No.: 15/084,713

(22) Filed: Mar. 30, 2016

(51) Int. Cl.
*G06F 9/455* (2018.01)
*G06F 11/36* (2006.01)
*G06F 16/21* (2019.01)
*H04L 12/24* (2006.01)
*H04L 12/26* (2006.01)
*H04L 29/08* (2006.01)

(52) U.S. Cl.
CPC ........ *G06F 9/45558* (2013.01); *G06F 11/366* (2013.01); *G06F 11/3636* (2013.01); *G06F 16/21* (2019.01); *H04L 41/065* (2013.01); *H04L 43/06* (2013.01); *H04L 43/0817* (2013.01); *H04L 67/10* (2013.01); *G06F 2009/45595* (2013.01)

(58) Field of Classification Search
CPC ............. G06F 9/45558; G06F 11/3636; G06F 11/366; G06F 16/21; G06F 2009/45595; H04L 41/065; H04L 43/06; H04L 43/0817; H04L 67/10
See application file for complete search history.

(56) References Cited

U.S. PATENT DOCUMENTS

| 7,184,437 B1 | 2/2007 | Cole et al. |
| 2014/0129700 A1* | 5/2014 | Mehta ................. H04L 43/0817 709/224 |

(Continued)

OTHER PUBLICATIONS

"HTML Living Standard," retrieved from https://html.spec.whatwg.org/multipage/comms.html#server-sent-events on Jun. 27, 2016, 27 pp.

(Continued)

*Primary Examiner* — Emerson C Puente
*Assistant Examiner* — Jonathan R Labud
(74) *Attorney, Agent, or Firm* — Shumaker & Sieffert, P.A.

(57) ABSTRACT

A controller coordinates execution of a set of related processes executed by respective devices in the virtual network, wherein coordinating comprises causing the respective devices to execute the set of related processes; receiving a data set for the set of related processes from the respective devices, comprising receiving operational states of the related processes from the respective devices; reading a previous data set comprising previous operational states of the related processes from the respective devices; processing an update to the previous operational states from the received operational states of the received data set; and aggregating the received operational states of the data set with the previous operational states of the related processes to form aggregated data of updated operational states.

20 Claims, 7 Drawing Sheets

(56) References Cited

U.S. PATENT DOCUMENTS

| | | | |
|---|---|---|---|
| 2014/0269435 A1* | 9/2014 | McConnell | H04L 12/1432 370/259 |
| 2015/0339212 A1 | 11/2015 | Mehta et al. | |
| 2015/0358231 A1* | 12/2015 | Zhang | H04L 45/38 370/392 |
| 2016/0057219 A1* | 2/2016 | Kore | H04L 67/28 709/248 |

OTHER PUBLICATIONS

"Introducing JSON," retrieved from http://www.json.org on Jun. 27, 2016, 7 pp.

ECMA Standard-404, "The JSON Data Interchange Format," Oct. 2013, 14 pp.

\* cited by examiner

US 10,379,890 B1

SYNCHRONIZED CACHE OF AN OPERATIONAL STATE OF DISTRIBUTED SOFTWARE SYSTEM

TECHNICAL FIELD

This disclosure generally relates to monitoring of distributed software systems.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical housing facilities.

SUMMARY

In general, this disclosure describes techniques for providing a synchronized cache of an operational state of a distributed software defined network (SDN) system. An SDN may include a network of a plurality of processing devices. The processing devices may each have multiple processes or tasks running on the different processing devices, with each process carrying out the same or substantially similar basic operations but on different instances of respective data. A controller coordinates the processing devices in order to manage the data flow to the switches/routers and other tasks including inventorying devices within the network and/or gathering network statistics. Data relating to the processing devices are represented as user-visible entities (UVEs) that report on an operational state of the processing devices. A user, such as an administrator, may monitor performance of each of the processing devices by monitoring data for each of the UVEs. As a task progresses, the operational state of the processing devices may change. Therefore this disclosure describes techniques for providing updates to the operational state across these UVEs. In particular, this is achieved by aggregating the updates and sending a message representing the aggregation of the updated operational state.

More specifically, this disclosure describes techniques to collect data pertaining to an updated operational state of a distributed system, process whether the data is an update to previously collected data pertaining to a previous operational state, and aggregate the updated data with the previously collected data to form aggregated data of updated operational states. The disclosure further describes techniques to store the aggregated data of updated operational states in a local database and to publish metadata of the updated operational states to a local bus. The disclosure further describes techniques to retrieve data from the local database, read UVE changes published on the local bus to determine if the operational state has been updated, and write messages to provide information on the updated operational states to a client.

In one example, a method includes coordinating execution of a set of two or more related processes executed by respective devices in the virtual network, wherein coordinating comprises causing the respective devices to execute the set of two or more related processes that perform substantially similar operations. The method also includes receiving a data set for the set of two or more related processes from the respective devices, wherein receiving the data set comprises receiving one or more operational states of the data set from the respective devices. The method further includes reading a previous data set for the set of two or more related processes from the respective devices, wherein reading the previous data set comprises reading one or more previous operational states of the data set from the respective devices. The method also includes processing an update to the one or more previous operational states from the one or more received operational states of the received data set. The method also includes, in response to processing the update, aggregating the one or more received operational states of the data set with the one or more previous operational states of the previous data set to form aggregated data of updated operational states. The method further includes generating a message comprising some of the aggregated data of updated operational states.

In another example, a controller device includes one or more network interfaces communicatively coupled to one or more devices of a virtual network. The controller device also includes a processor configured to: coordinate execution of a set of two or more related processes executed by respective devices in the virtual network, wherein coordinating comprises causing the respective devices to execute the set of two or more related processes that perform substantially similar operations; receive a data set for the set of two or more related processes from the respective devices, wherein receiving the data set comprises receiving one or more operational states of the data set from the respective devices; read a previous data set for the set of two or more related processes from the respective devices, wherein reading the previous data set comprises reading one or more previous operational states of the data set from the respective devices; process an update to the one or more previous operational states from the one or more received operational states of the received data set; in response to processing the update, aggregate the one or more received operational states of the data set with the one or more previous operational states of the previous data set to form aggregated data of updated operational states; and generate a message comprising some of the aggregated data of updated operational states.

The details of one or more examples are set forth in the accompanying drawings and the description below. Other features, objects, and advantages will be apparent from the description and drawings, and from the claims.

DETAILED DESCRIPTION

Figure 1:
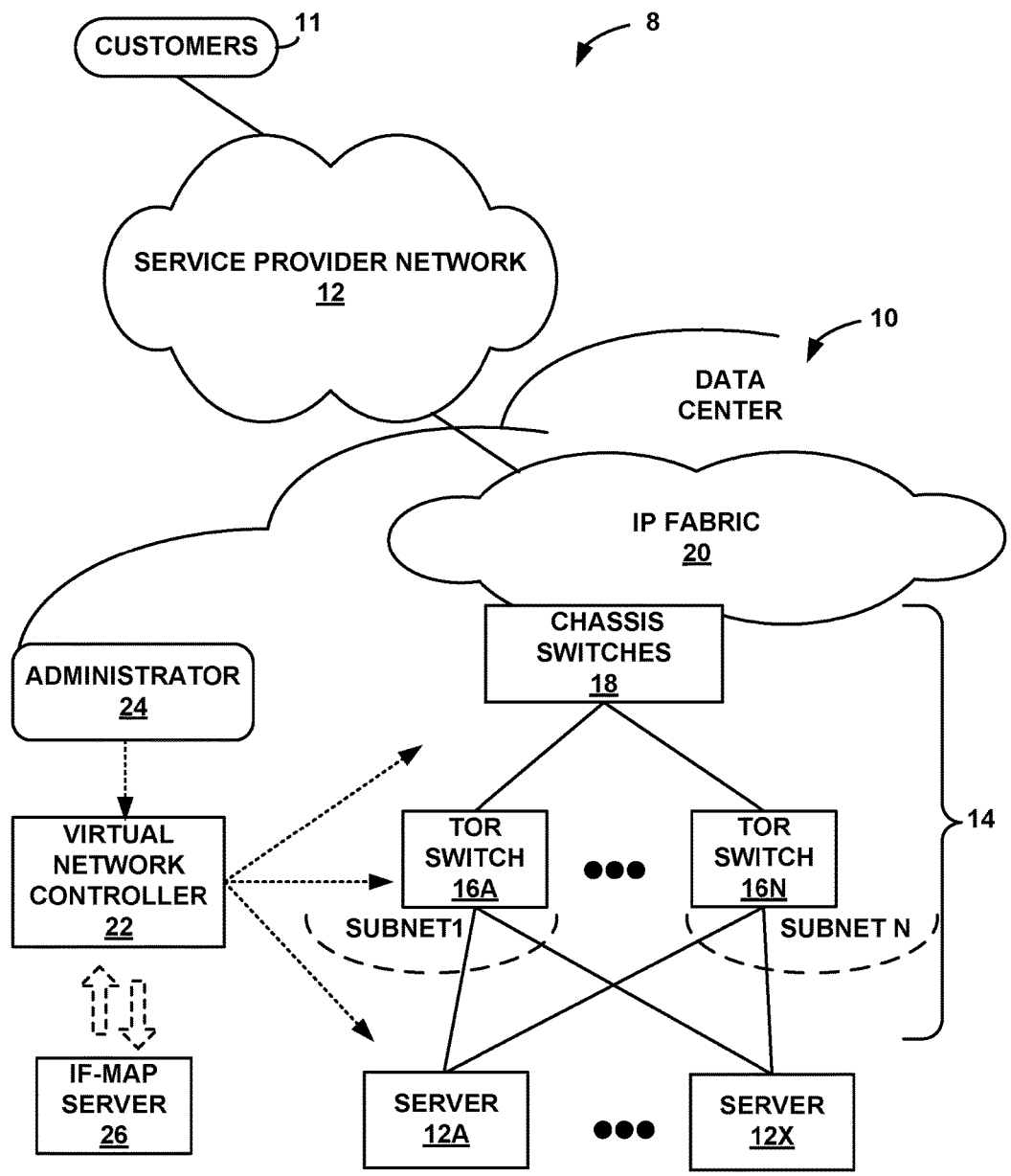
FIG. 1 is a block diagram illustrating an example data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 12. Data center 10 may, for example, host infrastructure equipment, such as networking and storage systems, redundant power supplies, and environmental controls. Service provider network 12 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 12. Chassis switches 18 aggregates traffic flows and provides high-speed connectivity between TOR switches 16. TOR switches 16A and 16B may be network devices that provide layer 2 (MAC address) and/or layer 3 (IP address) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 using service provider network 12.

Virtual network controller 22 ("VNC") provides a logically centralized controller for facilitating operation of one or more virtual networks within data center 10. In some examples, VNC 22 may operate in response to configuration input received from network administrator 24. The VNC 22 may control processing of servers 12 by assigning substantially similar processing to be performed by servers 12. For example, VNC 22 may coordinate multiple processes running on different machines, with each process carrying out the same or substantially similar basic operations but on different instances of respective data. In particular, VNC 22 may initially coordinate execution of a set of two or more related processes, e.g., data for a User Visible Entity (UVE), executed by respective devices (e.g., servers 12) in the virtual network of data center 10. As further described herein, UVEs are sets of data that represent the related processes that allow administrator 24 to view and/or monitor the operational state of the related processes in the virtual network of data center 10.

The VNC 22 may also receive and process the data for the set of two or more processes. For example, VNC 22 may process whether the received data for the set of two or more processes is an update to a previously received data set. In response to determining that the received data set is an update, the VNC 22 may aggregate the updated data with the previous data to form aggregated data of updated operational states of the processes of the distributed system. The VNC 22 may further store the aggregated data of updated operational states into a local database, and publish metadata representative of the updated operational states via a local bus of the VNC 22 in order for VNC 22 to write the updated operational states into streaming messages. In this way, VNC 22 may be configured to provide a synchronized cache of the operational state of two or more processes of a distributed software system. In other words, the VNC 22 may store updates to the operations state of the two or more processes of the distributed system and retrieve the updates to stream messages of the updates for real-time or near real-time monitoring, e.g., to administrator 24.

In general, in accordance with the techniques of this disclosure, computing devices of data center 10, and processes executed by the computing devices, may be divided into various tiers. Each tier is meant to be independently horizontally scalable, comprising multiple processes running on different machines, with each process carrying out the same or substantially similar basic operations but on different instances of respective data. Virtual network controller 22 may define User-Visible Entities (UVEs) to report on an operational state of the various tiers that may span multiple virtual routers, configuration nodes, and/or control nodes. In general, UVEs report on entities associated with a virtual network that can be managed such as, for example, virtual networks, virtual machines, virtual routers, and similar objects. The UVEs may define various data for monitoring the operational state of the various tiers. For example, UVEs may define attributes of processes to report an operational state of a tier that spans multiple virtual routers (e.g., the forwarding plane of a distributed router that creates a virtual overlay network), configuration nodes (e.g., node in virtual network controller responsible for management layer), or control nodes (e.g., node that implements the logically centralized portion of the control plane).

In one example, each of the UVEs has per-tier attributes, which help network administrator 24 to confirm whether the tiers are working correctly together or not. For example, each UVE may include data on connections and statistics. Virtual network controller 22 may receive data output during execution of the processes, and in accordance with the UVEs, extract values for the attributes defined by the UVEs. Virtual network controller 22 may further aggregate this data to present an aggregation of operational states across process types and process instances. For example, the UVE may define a manner in which to aggregate certain types of data, corresponding to the attributes, such as addition, union over sets, concatenation, list generation, or the like. In one example, virtual network controller 22 may process UVEs, and extract values for attributes defined by the UVEs, as described in U.S. Patent Application 2015/0339212, entitled "CREATING SEARCHABLE AND GLOBAL DATABASE OF USER VISIBLE PROCESS TRACES," the contents of ea which is incorporated herein by reference.

As will be further described herein, each of the UVEs may include identifiers, such as a key annotation (e.g., UVE key) and type (e.g., UVE type). The key annotation provides for a unique identifier of extracted values for the attributes defined by a particular UVE. UVE keys may be associated with a respective database partition (e.g., mapping UVE keys that belong in a particular partition of the operational database). For example, as the virtual network controller 22 processes a UVE, the UVE is assigned a partition attribute. When the UVE is assigned the partition attribute, the partition acquisition time is stored. This enables individual UVEs to be associated based on the partition attribute. For example, when examining the partition of a UVE, the UVE keys associated with the partition can be determined. The type may identify the UVE type, such as a virtual network UVE, virtual machine UVE, or virtual router UVE. The UVE type identifies the node-specific information that is extracted. Each of the UVE types may include different data associated with the particular type.

The UVE may also include contents of the UVE, which is the data associated with the operational state. The UVE contents may further include one or more structures (e.g., UVE structure name and UVE structure contents) to format the data, as further described herein.

Typically, each of the processes provides operational state information on an individual basis, which provides too much detail to the user. Because a given UVE's contents may depend on the state of multiple processes across multiple tiers, the techniques described herein provide for a collection of updated data based on UVEs that may be reported as one or more streaming messages. For example, the updated data of the UVEs may be aggregated and stored in a local database and a local bus so as to maintain a synchronized cache of the updated data. In this way, an administrator may use streaming messages of the information stored in the local database and local bus to provide real-time, or near-real time, updates of data according to the UVEs, and enable clients to diagnose various aspects of the virtual network of data center 10. In one example, the messages may include data indicative of types (e.g., UVE structure names), values (e.g., contents of the UVE), and key (e.g., UVE key). In this way, an administrator may determine in real time, using the messages, whether any information of the operational states of the connected computing devices have been updated (e.g., added, changed, or deleted) without requesting individual UVEs. As further described herein, a client may further request to stream a subset of the updated data using filters based on indexes of the data such as by type and/or value.

As discussed further below, virtual network controller 22 includes an analytics layer (e.g., analytics virtual machine 104 of FIG. 4) that is an intermediate layer that collects, collates, and presents information for understanding network usage and acts on generic rules. The UVEs may define rules in accordance with the analytics layer. The analytics layer may use definitions of the UVEs to extract information from communications output by the devices executing the corresponding processes, aggregate information for certain attributes, as defined by the UVEs, of the communications. The analytics layer may also determine the existence of updates to those aggregate values, re-aggregate the updated data with the previous aggregate values, and store the updated aggregated data to enable streaming messages of the extracted information. In this way, the techniques of this disclosure are generally directed to providing a synchronized cache of an operational state of a distributed software defined network (SDN) system without the need to request for each UVE individually.

Figure 2:
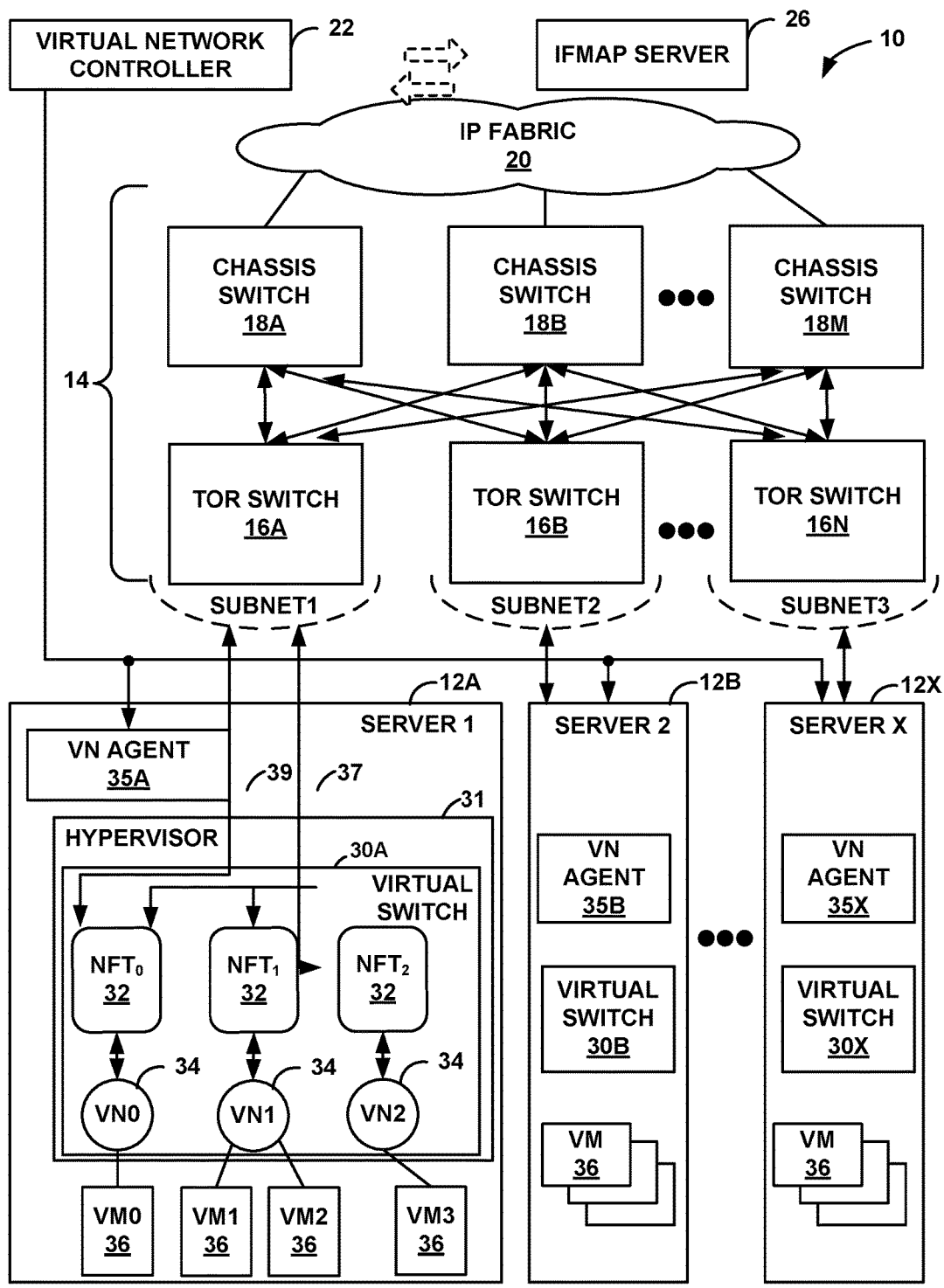
FIG. 2 is a block diagram illustrating in further detail an example system in which the techniques described herein may be implemented.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software switches 30A-30X (also referred to as a "virtual switches 30"). Virtual switches 30 dynamically create and manage one or more virtual networks 34 to be used by applications communicating with application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network 34 may use its own addressing and security scheme and may be viewed as orthogonal from the physical network and its addressing scheme. Various techniques may be used to transport packets within and across virtual network(s) 34 over the physical network.

Each virtual switch 30 may execute within a hypervisor, a host operating system or other component of each of servers 12. In the example of FIG. 2, virtual switch 30 executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, i.e., server 12A in the example of FIG. 2.

In one implementation, each of servers 12 includes a virtual network agent ("VN agent") 35A-35X ("VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as the overlay network of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicasting replication. In some cases, virtual network controller 22 maintains the routing information in the form of a radix tree having leaf nodes that represent destinations within the network. U.S. Pat. No. 7,184,437 provides details of an example router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

In accordance to the techniques described herein, there may be VMs 36 in multiple computing nodes that are attached to the same virtual network 34. User Visible Entities (UVEs) may provide a consolidated view of this virtual network across all these compute nodes. The virtual network agent 35 may report operational state information about the processes of a virtual network 34. For example, when a connection is changed, such as a link failure, a virtual network agent 35 local to the failed link (e.g., VN Agent 35A) may notify virtual network controller 22 of the routing change as data generated according to a User Visible Entity (UVE). Though each of the virtual network agents 35 may report data extracted based on UVEs to virtual network controller 22 independently, a single instance, aggregated across all generators of the network devices, of the UVE contents (e.g., UVE structure) may be presented to the virtual network controller 22. In this way, virtual network controller 22 may present the updated operational state (connection change) in the form of a streaming message.

Figure 3:
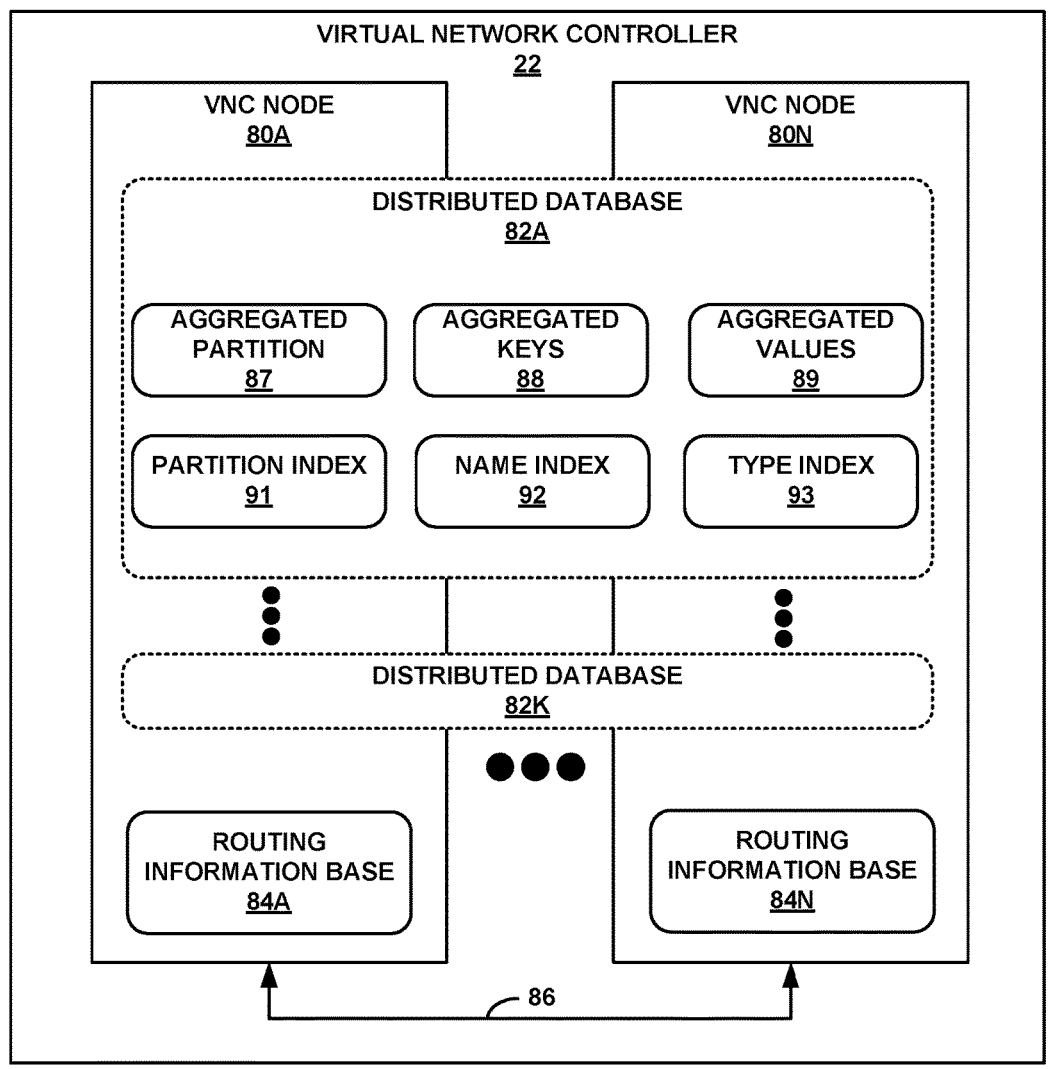
FIG. 3 is a block diagram illustrating an example implementation of a virtual network controller for facilitating operation of one or more virtual networks in accordance with one or more examples of this disclosure.

FIG. 3 is a block diagram illustrating an example implementation of a virtual network controller 22 for facilitating operation of one or more virtual networks in accordance with one or more examples of this disclosure. Virtual network controller 22 may, for example, correspond to virtual network controller 22 of data center 10 of FIGS. 1 and 2.

Virtual network controller (VNC) 22 of FIG. 3 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 80. In accordance with the techniques of this disclosure, the key/value pairs of the distributed database may enable VNC 22 to provide a synchronized cache of the operational state of a distributed software system.

In one example, during execution of one or more processes, each of the distributed databases 82 for each of the VNC nodes 80 may store aggregated extracted values for the attributes defined by a plurality of UVEs. In other words, the distributed databases 82 may store operational states as associations between UVE keys and the UVE contents associated with the UVE keys. In the example of FIG. 3, aggregated data stored in the distributed databases 82 may include one or more aggregated partitions 87, aggregated keys 88, and aggregated values 89. In general, the aggregated partition 87 may include a mapping of a partition number of a particular UVE with the acquisition time of the partition of that particular UVE (which is recorded when the virtual network controller 22 defines the UVE). This may include assigning the partition number as a database key and the partition acquisition time as the value. This way, a lookup of the aggregated partition 87 would provide a partition number-acquisition time pair of the distributed database stored by different VNC nodes 80, and may identify the UVE keys associated with the partition. Each of the distributed databases 82 may also store aggregated keys 88, which may include a set of UVE keys that are associated with the particular partition. A lookup of the aggregated keys 88 would thus provide a partition-keys pair of the distributed database stored by different VNC nodes 80. Each of the distributed databases 82 may also store aggregated values 89 that include, for each UVE key belonging to the partition, a map of the UVE contents, such as a UVE structure name and a UVE structure contents. This may include assigning the UVE structure name as a database key and the UVE structure contents as a database value. Accordingly, a lookup of the aggregated values provide a UVE structure name-UVE structure content pair of the distributed database stored by different VNC nodes 80.

As the virtual network controller 22 subsequently receives updated data output, in accordance with UVEs, during execution of subsequent processes, the virtual network controller 22 may gain ownership of new partitions, or lose ownership of partitions it currently owns. The partition associations may change due to restarts or failures of VNC nodes 80. The virtual network controller 22 may therefore re-balance the partitions, and then re-aggregate the UVEs. The virtual network controller 22 may store the aggregated data of updated operational states in a local database, such as distributed database 82. For example, the operational states are stored within aggregated partition 87, aggregated keys 88, and aggregated values 89. The aggregated partition 87, aggregated keys 88 and aggregated values 89 may be updated with the updated data output, such as updated operational states, as long as the updated data output is associated with the same partition as an earlier data extraction. This way, newly extracted data based on the UVEs may be associated with previously extracted data based on the UVEs, which enables the virtual network controller 22 to determine that the newly extracted data is an update to the previously extracted data. The updated data is then stored within aggregated partition 87, aggregated keys 88, and aggregated values 89 in the local database. The VNC nodes 80 may also store the partition acquisition time, so that the downstream processes using the aggregated information can handle the momentary case (during the startup and/or failure of VNC Nodes 80) of two different VNC Nodes 80 claiming to own the same partition for aggregation. In this way, information from the VNC Node 80 claiming to have the latest acquisition time is used.

In another example, the distributed databases 82 may further include indexes of the updated data output stored in the databases. The indexes may be used to filter messages within a stream of the updated data. In accordance with the techniques of this disclosure, the virtual network controller 22 may include a partition index 91, a name index 92, and a type index 93. The partition index 91 may include, for each partition of database, a map of UVE keys and a set of UVE structure names associated with the UVE keys. In particular, the partition index 91 may use the UVE key as a database key and the UVE structure name as a database value. The name index 92 may include, for each UVE structure name, a map of a set of UVE keys and the UVE structures associated with the UVE keys. The name index 92 may be used to filter the UVE stream by UVE structure name. The type index 93 may include, for each UVE type (e.g., UVE structure name), a map of a set of known UVE keys associated with the type. More particularly, the type index may provide a map of the initial UVE database, which is a map of the collected information. The collected information leads to a map of generator information (the devices that generated the data for UVEs), which further leads to a set of UVE keys. The type index 93 may be used to filter the UVE stream by UVE type.

Figure 4:
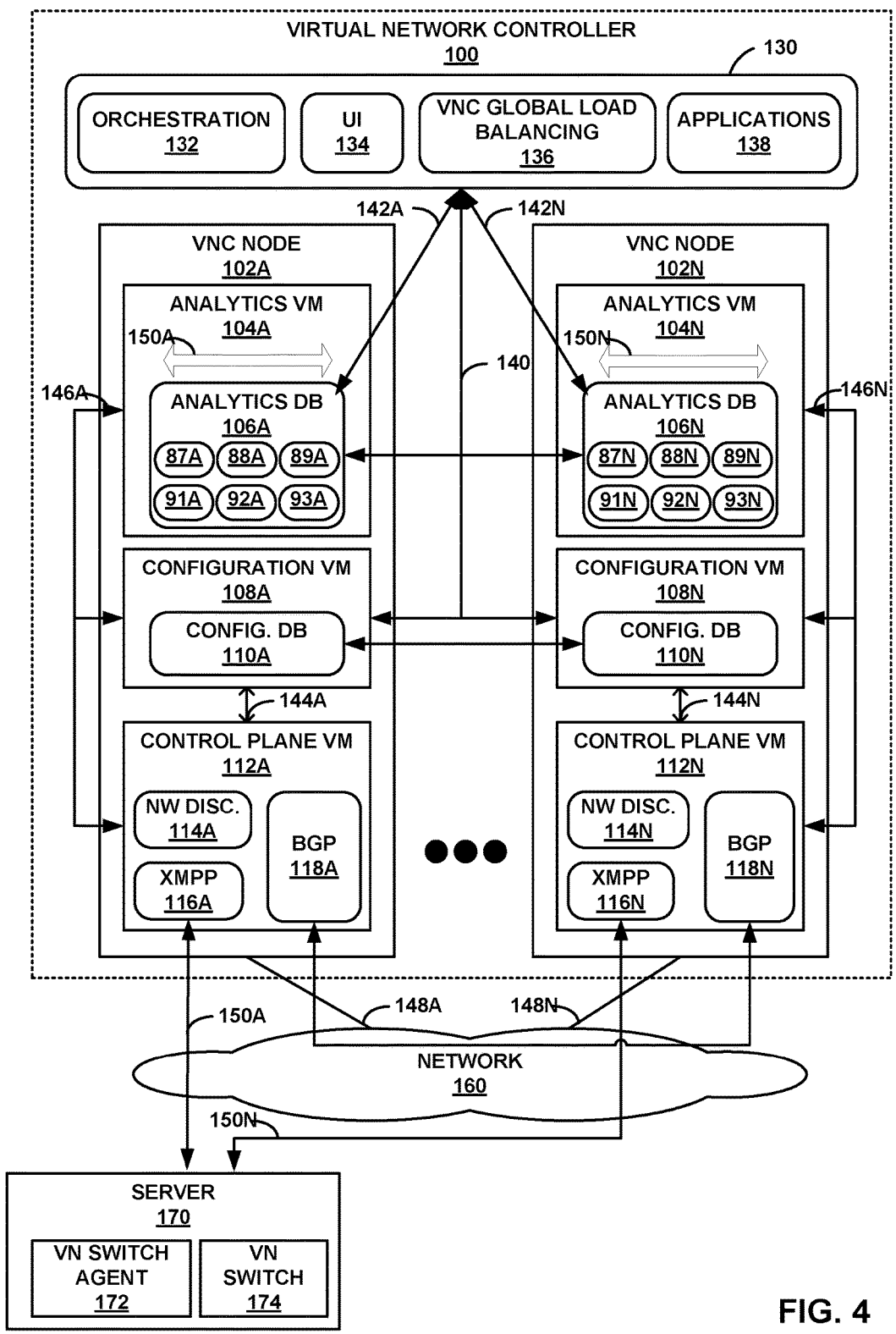
FIG. 4 is a block diagram illustrating an example implementation of a virtual network controller for facilitating operation of one or more virtual networks in accordance with one or more examples of this disclosure.

FIG. 4 is a block diagram illustrating an example implementation of a virtual network controller 100 for facilitating operation of one or more virtual networks in accordance with one or more examples of this disclosure. Virtual network controller 100 may, for example, correspond to virtual network controller 22 of data center 10 of FIGS. 1-3.

As illustrated in the example of FIG. 4, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 3. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol.

VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, the functionality being described hereinafter primarily with respect to VNC node 102A, for example. VNC node 102A may include an analytics database 106A for storing diagnostic information related to a first set of elements managed by VNC node 102A. For example, analytics database 106A may store data extracted from communications output by the devices executing processes based on UVEs. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 3.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 3.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 170, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of elements to configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 3. For example, as described above, aggregated data may be stored in the analytics database 106A and may include one or more aggregated partitions 87, aggregated keys 88, and aggregated values 89 associated with data extracted based on UVEs. Visibility information may describe visibility of both distributed VNC 100 itself and of customer networks. The distributed database may further include Server-Sent Events (SSE) interface for sending and receiving streaming messages as discussed further herein.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

In accordance with the techniques of this disclosure, virtual network controller 100 may be configured to provide a synchronized cache of the operational state of a distributed software system. In particular, virtual network controller 100 may initially determine the set of two or more processes executed by respective devices in a virtual network of network 160, and receive and aggregate the data for the set of two or more processes. As stated above, the User Visible Entities (UVEs) may provide data on the operating state of virtual routers, configuration nodes, and/or control nodes. The virtual network controller 100 may then determine whether data for the set of two or more processes has been updated and store the updated data within a local database, and publish information about the update on a local bus, such as analytics database 106A and analytics VM bus 150A.

In some examples, virtual network controller 100 includes analytics virtual machines 104A-104N (collectively, "analytics VMs 104"), which act as intermediate layers that act on generic rules. Each of the analytics VMs 104 may use definitions of the UVEs to extract information from communications output by the devices executing the corresponding processes and aggregate values for certain attributes, as defined by the UVEs, of the communications. Each UVE may be associated with a definition file. For example, the UVEs may define attributes of processes to retrieve the operational state of the various tiers (e.g., virtual machines implementing respective controller processes within control plane VMs 112) within the software defined networking (SDN) system. Virtual network controller 100 may receive data output during execution of the processes across different tiers, and in accordance with the UVEs, extract values for the attributes defined by the UVEs.

The definition file may also specify a type of aggregation for each attribute associated with the UVE (e.g., summation, concatenation, list formation, union over sets, or the like) to present an aggregation of operational states across process types and process instances. Each of analytics VMs 104 may use extra attributes defined in the interface definition language file to perform aggregation. When UVEs are sent to the analytics tier, messages may mark attributes of the UVEs with aggregation tier. An aggregator may use the aggregation information of the definition file. Thus, devices or processes executing at the analytics tier may receive both values for attributes associated with a UVE, as well as aggregation information associated with the UVE. In this manner, these devices or processes at the analytics tier may use the aggregation information to determine how to aggregate values for the attributes. In this manner, the aggregation of information can be performed without the processes that generate the information actively participating in the aggregation. That is, an aggregator may receive individual streams of information from the various processes and aggregate the information, without requiring a change on the part of the processes that generate the information to be aggregated.

Because the received data output are from different types of generators (e.g., virtual router within server 170, control plane VM 106, or configuration VM 108), a key annotation (e.g., UVE key) associating the data output needs to be consistent across all tiers of the UVEs to allow correlation and aggregation. The key annotations may further be divided into partitions that provide, among others, information on ownership and acquisition time for the data received in accordance with the UVEs. For example, when data is extracted in accordance with one of the UVEs, the extracted data is associated with a partition, stores the partition acquisition time, and reads all data of all UVEs that belong to that particular partition. As UVEs are processed, each UVE process owns a subset of the partitions at a given time.

In addition, as UVEs are processed, a list of partitions the UVE owns is published, along with the partition acquisition time. Virtual network controller 100 may then monitor any changes or updates to the data, based on the list of partitions, of all UVEs that belong to that particular partition. Virtual network controller 100 may determine that the changes or updates remain in the same partition and may re-aggregate the updated data with the data of all the UVEs. However, the re-aggregation operation may result in an addition, change, or deletion of one or more contents of the data (e.g., UVE structure name and value) for a given key from a previous aggregation. As such, virtual network controller 100 re-balances partitions as the data content (e.g., UVE struct value) extracted may have changed from a previous aggregation.

For example, when processing a UVE, the extracted data of a process may have subsequently changed, and a re-aggregation of the updated data occurs. In response to the re-aggregation of the data, the updated aggregated data may be stored in a local database, such as analytics database 106A. In one example, the aggregated data stored in analytics database 106A may be stored as one or more aggregated partitions 87, aggregated keys 88, and aggregated values 89. More specifically, the aggregated partition 87 may include a mapping of a partition number of a UVE as a database key, and a mapping of the acquisition time (which is recorded when the virtual network controller 22 defines the UVE) as the value associated with the database key.

In other words, as updated data is extracted based on the UVEs, the associated partition of the extracted data is stored within the analytics database 106A as a key that associates with the partition acquisition time. A lookup of the aggregated partition 87 from one of analytics databases 106 would therefore provide a partition number/acquisition time pair of the analytics database 106 stored by different VNC nodes 102. Each of the analytics databases 106 may also store aggregated keys 88, which may include a set of UVE keys that live in a particular partition. In other words, a lookup of a particular partition from the aggregated keys 88 from analytics database 106A would therefore provide associated keys that belong to the particular partition.

Each of the analytics databases 106 may also store aggregated values 89 that include, for each UVE key, a map of a UVE structure name as the key and the UVE structure contents as the value. In other words, the data content extracted and name of the data content is stored in association with a particular key in aggregated values 89 of analytics databases 106A. Accordingly, a lookup of the aggregated values provide a UVE structure name/UVE structure content pair of the distributed database stored by different VNC nodes 80. Though the extracted data may be stored within a local database, such as analytics database 106A, the extracted data may be copied across the other analytics databases 106.

Virtual network controller 100 may additionally publish metadata for each of the re-aggregated updated data based on UVEs on a local bus 150A-150N (collectively, "local buses 150"). The metadata may include one or more updated partition numbers, UVE keys, and UVE structure names. As stated above, a list of partitions the UVE currently owns is published, along with the partition acquisition time. Virtual network controller 100 utilizes this published list, along with the data stored in the local database and local bus, to generate one or more messages that are indicative of any changes or updates for one or more attributes (e.g., operational state) corresponding to the tier, as defined by a corresponding UVE.

In one example, virtual network controller 100 may modify the "data" field of a server-sent event (SSE) object to include at least one of a type field, a value field, and a key field. More information regarding the SSE messaging format is available https://html.spec.whatwg.org/multipage/comms.html#server-sent-events, which is incorporated by reference in its entirety. The key field may include a UVE key that refers to the key of the UVE. The type field may include a single instance of a UVE structure name associated with the UVE key. Alternatively, the type field may have a value of "null" that may indicate that all UVE structures of a given UVE key are being deleted. The value field may include a UVE structure content associated with the UVE structure name. In other words, the value field may include the actual contents of the given UVE structure name of the given UVE key. Alternatively, the value field may have a value of "null" that indicates the given UVE structure name is being deleted. In one example, if both UVE structure name and UVE structure value are "null," it indicates that all UVE structures of the given UVE key are being deleted. In this way, the type field, value field, and key field of a streaming message may provide an administrator information to diagnose various aspects of the virtual network of network 160. In particular, the information may provide data indicative of one or more of a connection failure, a device failure, and/or input/output statistics.

The administrator may determine, using the messages, whether any or all of these conditions apply and act accordingly, e.g., by reprogramming a device of network 160, replacing a device of network 160, adding, replacing, or removing links between devices, adding or upgrading software for one or more devices of network 160, or the like, based on the contents of the message. In other words, the administrator may view the updated operational state in the face of system failures in real-time, or near real-time.

Virtual network controller 100 may further provide these messages as streaming messages when updates to the aggregated data occur. For example, virtual network controller 100 may present the messages via both pull (client asks for the current state of an object) and push (client wants updates when an object changes) methods. By utilizing the SSE messaging format, virtual network controller may push updated aggregated data that was extracted based on UVEs—stored in local distributed databases such as analytics database 106 and published on local buses 150—to enable clients to maintain a cache of the updated data to diagnose various aspects of the virtual network of data center 10.

Figure 5:
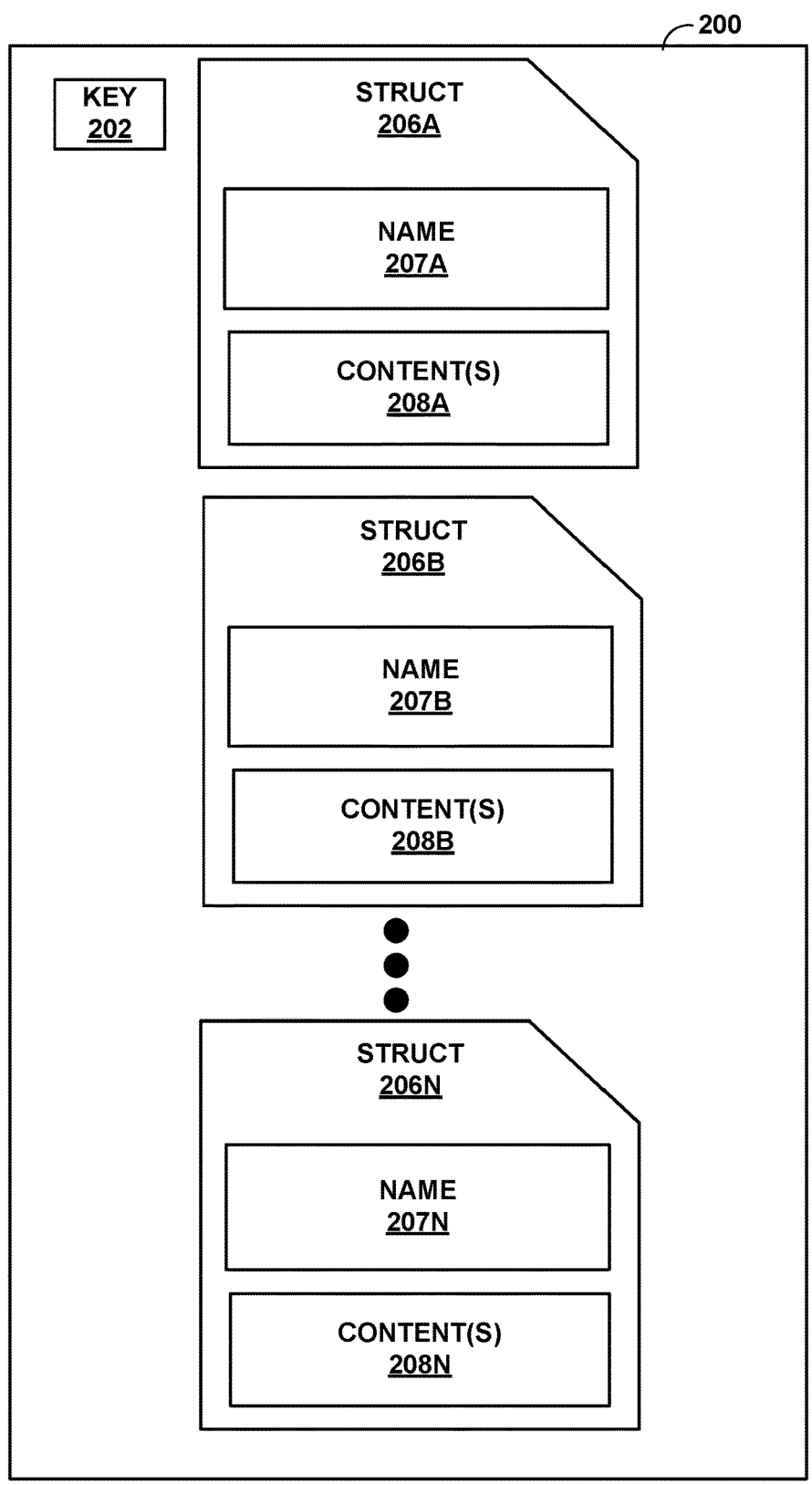
FIG. 5 is a block diagram illustrating an example User-Visible Entity (UVE), in accordance with one or more techniques of this disclosure.

FIG. 5 is a block diagram illustrating an example User-Visible Entity (UVE) 200, in accordance with one or more techniques of this disclosure. The example of FIG. 5 may include a UVE key 202 and the contents of the UVE, which may be represented in a JavaScript Object Notation (JSON) ECMA-404 format as described in the ECMA standard, titled "The JSON Data Interchange Format," dated October 2013, herein incorporated by reference in its entirety. The UVE key 202 may represent a key annotation correlating and aggregating UVEs across multiple processes that are monitored. A UVE key may be a system-wide unique key that is associated with each UVE, such as UVE 200.

A computing device may use the UVE key 202 to identify a particular UVE to get information about the UVE, such as the UVE contents. The contents of the UVE may include UVE structures 206A-206N, where each of the UVE structures 206 may include UVE structure names 207A-207N and UVE structure contents 208A-208N, respectively. Common UVE contents may include the IP address of the node, a list of processes running on the node, and the CPU and memory utilization of the running processes. The UVE structure may represent a specific UVE type, such as a virtual network, virtual machine, virtual router, and the like. In this way, there is a UVE for each node type. For example, a UVE for the control plane VM 112 of FIG. 4 may include information about its connectivity to the virtual routers and other control nodes.

In another example, a UVE for the analytics VM 104 of FIG. 4 may include information about how many UVE generators are connected to it. The UVE structure contents may be identified by the UVE structure name. In accordance with the techniques of this disclosure, the UVE key and UVE contents may be collected by the virtual network controller and stored within a local database of the virtual network controller, such as analytics database 106 of FIG. 4. The UVE may be represented as a JavaScript Object Notation (JSON), which is described in http://www.json.org and is incorporated herein in its entirety.

Figure 6:
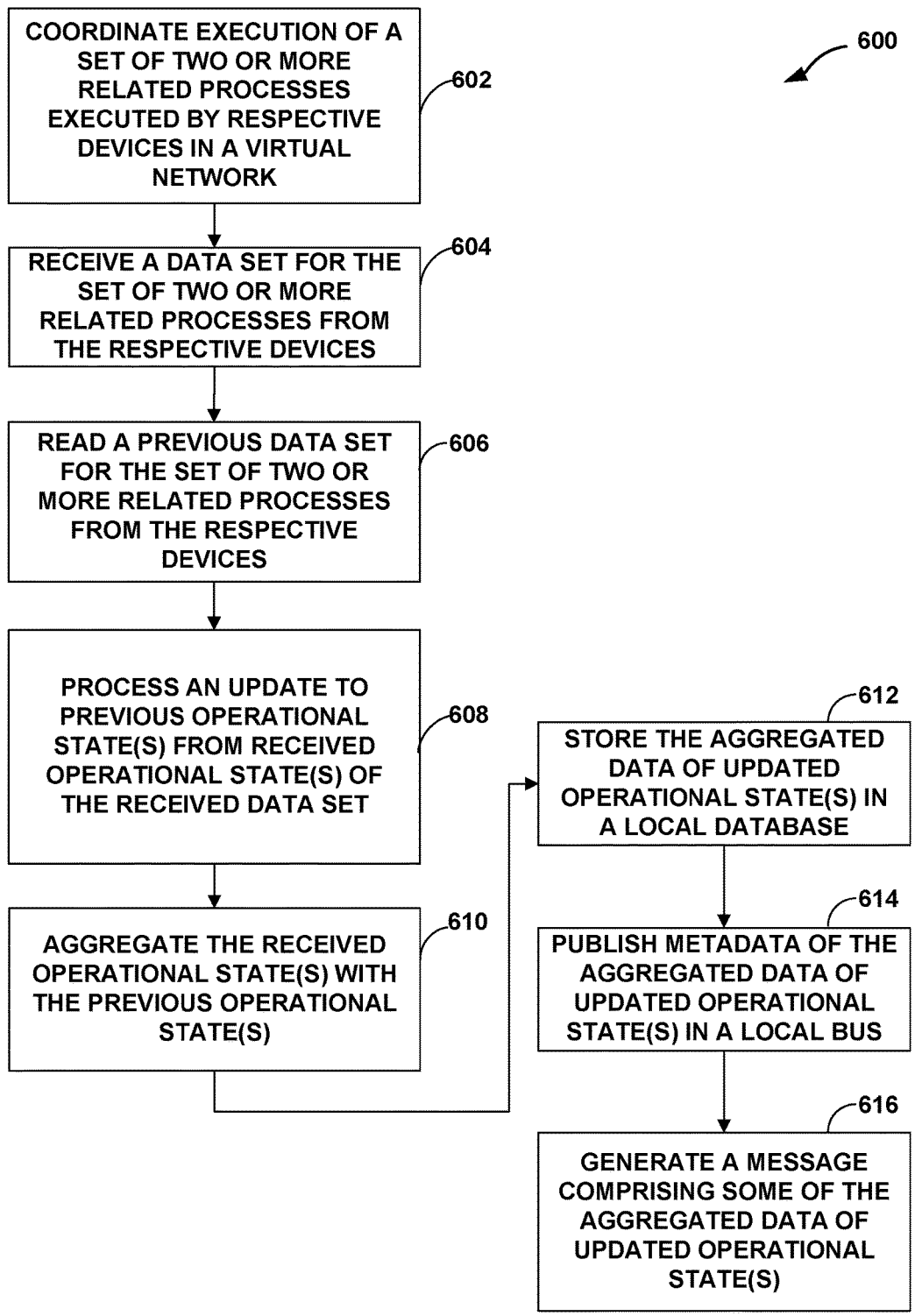
FIG. 6 is a flowchart illustrating a synchronization process, in accordance with one or more techniques of this disclosure.

FIG. 6 is a flowchart illustrating an example method 600 that may be carried out, e.g., in the systems of FIGS. 1-4. Although generally described with respect to the example of FIG. 4, it should be understood that other devices or modules may be configured to perform any or all of the steps in the method of FIG. 6. For example, virtual network controller 22 may be configured to perform any or all of the steps of the method of FIG. 6. For purposes of explanation, analytics VM 104 of FIG. 4 is explained as performing the steps of FIG. 6.

In one example, analytics VM 104 may coordinate execution of a set of two or more related processes executed by respective devices (e.g., servers) in a virtual network (602). For example, the virtual network may comprise an overlay network formed over a physical network and between switches executed by a plurality of devices including a first virtual switch executed by the first device and a second virtual switch executed by the second device. The analytics VM 104 may coordinate the execution of a first of two processes executed by the first device within a plurality of devices that form a physical network, and a second of two processes executed by the second, different device of the plurality of devices. The plurality of devices may include multiple vRouters, configuration VMs 108, and control VMs 112. Analytics VM 104 may coordinate the respective devices to execute the set of two or more related processes that perform substantially similar operations but on different instances of respective data. In other words, the set of two or more related processes executed by the respective devices in a virtual network may be configured to generate at least some of the data for the User Visible Entity (UVE). As stated above, analytics VM 104 may coordinate the execution of UVEs to collect information related to the processes executing within the virtual network.

Analytics VM 104 may then receive a data set for the set of two or more related processes from the respective devices (604). For example, analytics VM 104 may receive data output during execution of the related processes, and in accordance with the UVEs, extract values for the attributes defined by the UVEs. This data may include a list of processes running on the node, the CPU and memory utilization of the running processes, or the like. In particular, analytics VM 104 may receive operational state fragments of the running processes of the respective devices within the virtual network.

Analytics VM 104 may then read a previous data set for the set of two or more related processes from the respective devices (606). This includes processing the operational state fragments from all UVEs that were previously collected. In other words, the data of the previous data set may include values extracted from UVEs that represent the previous operational state of the devices within the virtual network.

Analytics VM 104 may then process the received data set to determine if the received data set is an update to the previous data set (608). For example, analytics VM 104 may process the received operational states (e.g., the newly extracted values for UVEs) and determine if the received operational states are an update to previous operational states (e.g., the previously extracted values for UVEs). Each update includes the partition number, which may be used to locate within the local database and local bus where UVE contents are available based on a per-partition basis.

Analytics VM 104 may then aggregate the received operational states with the previous operational states to form aggregated data of updated operational states (610). The received data set may include a change in the operational state of UVEs that belongs to a particular set of UVE keys. Analytics VM 104 may then aggregate the new operational state of UVEs with the previous operational states to form an aggregate data of updated operational states. For example, analytics VM 104 may store the aggregated data of updated operational states in a local database of the controller device (612).

As described above, storing the aggregated data of updated operational states may include storing an aggregate partition, an aggregate key, and an aggregate value in the local database. An aggregate partition may include a mapping of a partition number of the updated operational states with the acquisition time of the updated operational states. This may include assigning the partition number as a database key and the partition acquisition time as the value. This way, a lookup of the aggregated partition would provide a partition number-acquisition time pair. This enables the downstream processes in Analytics VMs 104 instances which use the aggregated information (element 616) to handle the momentary case (during the startup and/or failure of Analytics VMs 104 instances) of two different Analytics VMs 104 instances claiming to own the same partition for aggregation. In this example, information from the Analytics VM 104 instance claiming to have the latest acquisition time for the partition is used. An aggregated key may include a set of UVE keys that are associated with the particular partition that stores the updated operational states. A lookup of the aggregated key would provide a partition-key pair. An aggregated value may include a mapping of the UVE contents, such as UVE structure names of the updated operational states and UVE structure contents of the updated operational states. This may include assigning the UVE structure names as a database key and the UVE structure contents as a database value. This way, a lookup of the aggregated value provides a UVE structure name-UVE structure content pair.

Analytics VM 104 may also publish metadata of the aggregated data of updated operational states on a local bus of the controller device (614). The metadata may include one or more updated partition numbers, UVE keys, and UVE structure names associated with the updated operational states. The metadata provides information on UVE changes that indicate the operational state has been updated.

Analytics VM 104 may also generate a message comprising some of the aggregated data of updated operational states (616). An individual Analytics VM 104A uses metadata from all instances of Analytics VMs 104 to read the local aggregate databases of all the instances of Analytics VMs 104. Two different instances of Analytics VMs 104 may claim ownership of the same partition while Analytics VMs 104 are starting up or shutting down. In this case, data is used from the specific Analytics VM 104 instance that is reporting the latest partition acquisition time for the partition. As stated above, the virtual network controller retrieves the data stored in all the local aggregate databases, and determines from the local buses that the operational state has been updated, to generate one or more messages that are indicative of any changes or updates for one or more attributes (e.g., operational state) corresponding to the tier. For example, the virtual network controller may modify the "data" field of a server-sent event (SSE) object to include at least one of a type field, a value field, and a key field. The key field may include a UVE key that refers to the key of the UVE. The type field may include a single instance of a UVE structure name associated with the UVE key. The value field may include a UVE structure content associated with the UVE structure name. The messages may be presented via both pull and push methods. By utilizing the SSE messaging format, virtual network controller may push updated aggregated data that was extracted based on UVEs—stored in local distributed databases such as analytics database and published on local buses—to enable clients to maintain a cache of the updated data to diagnose various aspects of the virtual network of data center.

Analytics VM 104 may utilize indexes to filter the content of the messages. For example, the virtual network controller may include indexes of the updated data output stored in the databases. As stated above, indexes may include a partition index, a name index, and a type index. The partition index may include, for each partition of database, a map of UVE keys and a set of UVE structure names associated with the UVE keys. The name index may include, for each UVE structure name, a map of a set of UVE keys and the UVE structures associated with the UVE keys. The name index may be used to filter the UVE stream by UVE structure name. The type index may include, for each UVE type, a map of a set of known UVE keys associated with the type. More particularly, the type index may provide a map of the initial UVE database, which is a map of the collected information. The collected information leads to a map of generator information (the devices that generated the data for UVEs), which further leads to a set of UVE keys. The type index may be used to filter the UVE stream by UVE type.

Figure 7:
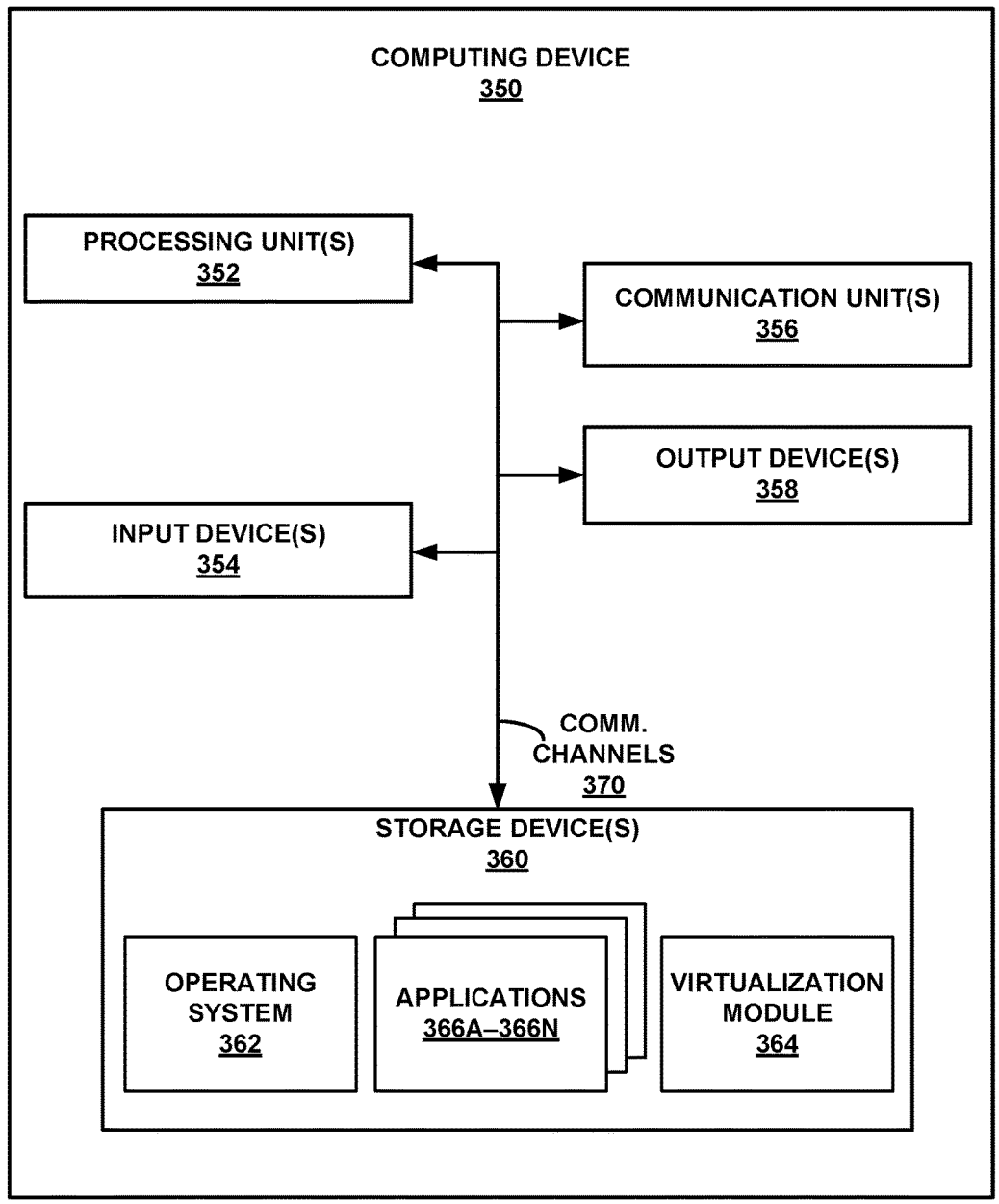
FIG. 7 is a block diagram illustrating an example computing device for providing a synchronized cache of an operational state of a distributed software defined network (SDN) system, in accordance with one or more techniques of this disclosure.

FIG. 7 is a block diagram illustrating an example computing device 350 for providing a synchronized cache of an operational state of a distributed software defined network (SDN) system, in accordance with one or more techniques of this disclosure. FIG. 7 illustrates only one particular example of computing device 350, and many other examples of computing device 350 may be used in other instances. Computing device 350 may correspond to a virtual network controller. That is, virtual network controllers 22, 100 may include components substantially similar to those illustrated in FIG. 7. Computing device 350 may be configured to perform any of the various techniques described in this disclosure, e.g., the method of FIG. 6.

As shown in the specific example of FIG. 7, computing device 350 includes one or more processing units 352, one or more communication units 356, one or more input devices 354, one or more output devices 358, and one or more storage devices 360. Computing device 350, in the specific example of FIG. 7, further includes operating system 362, virtualization module 364, and one or more applications 366A-366N (collectively "applications 366"). Each of components 352, 356, 354, 358, and 360 may be interconnected (physically, communicatively, and/or operatively) for inter-component communications. As one example in FIG. 7, components 352, 356, 354, 358, and 360 may be coupled by one or more communication channels 370. In some examples, communication channels 370 may include a system bus, network connection, interprocess communication data structure, or any other channel for communicating data. Applications 366, virtualization module 364, and operating system 362 may also communicate information with one another as well as with other components in computing device 350.

Processing units 352, in one example, are configured to implement functionality and/or process instructions for execution within computing device 350. For example, processing units 352 may be capable of processing instructions stored in storage devices 360. Examples of processing units 352 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 360 may be configured to store information within computing device 350 during operation. Storage devices 360, in some examples, are described as a computer-readable storage medium. In some examples, storage devices 360 are a temporary memory, meaning that a primary purpose of storage devices 360 is not long-term storage. Storage devices 360, in some examples, are described as a volatile memory, meaning that storage devices 360 do not maintain stored contents when the computer is turned off. Examples of volatile memories include random access memories (RAM), dynamic random access memories (DRAM), static random access memories (SRAM), and other forms of volatile memories known in the art. In some examples, storage devices 360 are used to store program instructions for execution by processing units 352. Storage devices 360, in one example, are used by software or applications running on computing device 350 (e.g., operating system 362) to temporarily store information during program execution.

Storage devices 360, in some examples, also include one or more computer-readable storage media. Storage devices 360 may be configured to store larger amounts of information than volatile memory. Storage devices 360 may further be configured for long-term storage of information. In some examples, storage devices 360 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 350, in some examples, also includes one or more communication units 356. Communication units 356 represent examples of network interfaces for communicating with external devices, e.g., devices of an SDN that execute various processes, e.g., processes conforming to various tiers, as discussed above. Computing device 350, in one example, utilizes communication units 356 to communicate with external devices. Communication units 356 may communicate, in some examples, by sending data packets over one or more networks, such as one or more wireless networks, via inbound and outbound links. Communication units 356 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components. In some examples, computing device 350 utilizes communication units 356 to receive data regarding processes executed by external devices, which processing units 352 may aggregate in accordance with the techniques of this disclosure.

Computing device 350, in one example, also includes one or more input devices 354. Input devices 354, in some examples, are configured to receive input from a user through tactile, audio, or video feedback. Examples of input devices 354 include a presence-sensitive display, a mouse, a keyboard, a voice responsive system, video camera, microphone or any other type of device for detecting a command from a user. In some examples, a presence-sensitive display includes a touch-sensitive screen.

One or more output devices 358 may also be included in computing device 350. Output devices 358, in some examples, are configured to provide output to a user using tactile, audio, or video stimuli. Output devices 358, in one example, include a presence-sensitive display, a sound card, a video graphics adapter card, or any other type of device for converting a signal into an appropriate form understandable to humans or machines. Additional examples of output devices 358 include a speaker, a cathode ray tube (CRT) monitor, a liquid crystal display (LCD), or any other type of device that can generate intelligible output to a user.

Computing device 350 may include operating system 362. Operating system 362, in some examples, controls the operation of components of computing device 350. For example, operating system 362, in one example, facilitates the communication of applications 366 with processing units 352, communication units 356, input devices 354, output devices 358, and storage devices 362. Applications 366 may each include program instructions and/or data that are executable by computing device 350. As one example, application 366A may include instructions that cause computing device 350 to perform one or more of the operations and actions described in the present disclosure.

In accordance with techniques of the present disclosure, computing device 350 may be configured to aggregate data for a set of two or more processes, determine updates to the aggregate data, re-aggregate the updated data to form an updated aggregate data, and store the updated aggregate data into a local database and local bus. In general, computing device 350 may define User-Visible Entities (UVEs) for various tiers to monitor processes of the various tiers. For example, computing device 350 may receive data output during execution of the processes, and in accordance with the UVEs, extract values for the attributes defined by the UVEs. Computing device 350 may further aggregate this data with a previous data set so as to form an aggregate data of updated operational states. For example, the UVE may define a manner in which to aggregate certain types of data, corresponding to the attributes, such as addition, union over sets, concatenation, list generation, or the like.

Computing device 350 may then store the aggregated data of updated operational states into storage device 360. Computing device 350 may utilize the updated aggregate data to generate one or more messages that are indicative of an update to data, as defined by a corresponding UVE. Computing device 350 may stream the messages to enable an administrator to diagnose various aspects of the virtual network.

In this manner, computing device 350 represents an example of a controller device configured to determine, for a virtual network, a set of two or more processes executed by respective devices in the virtual network, receive an original data for the set of two or more processes, aggregate the data for the set of two or more processes to form aggregated data for the set of two or more processes, receive a subsequent data for the set of tow or more processes, determine that the second data for the set of two or more processes includes updated data, aggregate the original data and the subsequent data to form an updated aggregated data set, and stream the updated aggregated data set.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

The techniques of this disclosure may also be embodied in transitory storage media, such as signals and carrier waves. Such media are generally referred to as communications media. Thus, computer-readable media generally may correspond to (1) tangible, computer-readable storage media that is non-transitory, or (2) a communication medium such as a signal or carrier wave. Communication media, such as signals and carrier waves, are considered transitory, and hence, not considered non-transitory.

Various examples have been described. These and other examples are within the scope of the following claims.

What is claimed is:

1. A method comprising:
coordinating, by a controller device for a virtual network, execution of a set of two or more related processes executed by respective devices in the virtual network, wherein coordinating comprises causing the respective devices to execute the set of two or more related processes that perform substantially similar operations;
receiving, by the controller device, a data set for the set of two or more related processes from the respective devices, wherein receiving the data set comprises receiving one or more operational states of the related processes from each of the respective devices, and wherein the operational states of the related processes each define one or more attributes of the corresponding processes and is associated with one or more respective partitions of a database on the controller device;
reading, by the controller device, a previous data set for the set of two or more related processes from the respective devices, wherein reading the previous data set comprises reading one or more previous operational states of the related processes from the respective devices;
processing, by the controller device, an update to the one or more previous operational states from the one or more received operational states of the related processes, wherein processing the update includes determining that the one or more previous operational states of the related processes and the one or more received operational states are associated with the same one or more respective partitions of the database;

in response to processing the update, aggregating, by the controller device, the one or more received operational states of the related processes with the one or more previous operational states of the related processes to form aggregated data of updated operational states; and
generating, by the controller device, a message comprising data representing the aggregated data of updated operational states.

2. The method of claim 1, wherein the aggregated data of updated operational states comprises data for a User-Visible Entity (UVE), and wherein the two or more related processes are configured to generate at least some of the data for the UVE.

3. The method of claim 2, wherein the UVE is associated with the one or more respective partitions of the database on the controller device that store the previous operational states and updated operational sates for the associated UVE, and
wherein the one or more partitions of the database comprise:
one or more partition numbers that identify the one or more partitions of the database that store the previous operational states and the received operational states, and
one or more partition acquisition times of when the previous operational states and the received operational states were collected from the respective devices.

4. The method of claim 1, wherein aggregating the one or more received operational states of the related processes with the one or more previous operational states of the related processes to form aggregated data of updated operational states comprises:
storing the aggregated data of updated operational states in a local database of the controller device; and
publishing metadata representative of the aggregated data of updated operational states via a local bus of the controller device.

5. The method of claim 4, wherein storing the aggregated data of updated operational states in the local database of the controller device comprises:
storing at least one of an aggregate partition, an aggregate key, and an aggregate value in the local database,
wherein storing the aggregate partition comprises storing a grouping of one or more partition numbers of the updated operational states with the one or more partition acquisition times of the updated operational states for forming a partition number-partition acquisition time pair, wherein the partition numbers identify the one or more partitions of database that store the updated operational states,
wherein storing the aggregate key comprises storing a grouping of one or more UVE keys associated with the partitions of database that store the updated operational states for forming a partition-UVE key pair, and
wherein storing the aggregate value comprises storing a grouping of one or more UVE structure names of the updated operational states with one or more UVE structure contents of the updated operational states for forming a UVE name-content pair, wherein the one or more UVE structure contents comprises data of the updated operational states, and wherein the one or more UVE structure names comprises names to identify the UVE structure contents.

6. The method of claim 4, wherein publishing metadata representative of the aggregated data of updated operational states via the local bus of the controller device comprises:
publishing one or more partition numbers that identify one or more partitions of database that store the updated operational states;
publishing one or more UVE keys associated with the one or more partitions of database that store the updated operational states; and
publishing one or more UVE structure names of the updated operational states, wherein the one or more UVE structure names comprises names to identify the UVE structure contents that comprise data of the updated operational states.

7. The method of claim 4, wherein storing the aggregated data of updated operational states in the local database of the controller device comprises:
storing at least one of a partition index, a name index, and a type index,
wherein storing the partition index comprises storing a grouping of one or more UVE keys of the updated operational states and one or more UVE structure names of the updated operational states for each partition of database that stores the updated operational states,
wherein storing the name index comprises storing a grouping of one or more UVE structure contents of the updated operational states and the one or more UVE keys of the updated operational states for each UVE structure name of the updated operational states, and
wherein storing the type index comprises storing a grouping of the one or more UVE keys of the updated operational states for each UVE type of the updated operational states.

8. The method of claim 7, wherein generating the message comprising data representing the aggregated data of updated operational states comprises:
filtering the messages based on at least one of the partition index, the name index, and the type index.

9. The method of claim 1, wherein generating the message comprising data representing the aggregated data of updated operational states comprises:
reading all instances of local aggregated metadata to read all instances of the aggregated data of updated operational states of local aggregate databases of the virtual network, wherein when two instances report a same partition number, the instance with a later partition acquisition time is used;
generating a type field comprising one or more UVE structure names, wherein the UVE structure names comprise one or more names associated with the updated operational states;
generating a value field comprising one or more UVE structure contents, wherein the UVE structure contents comprise data of the updated operational states; and
generating a key field comprising one or more UVE keys, wherein the one or more UVE keys associate the updated operational states with partitions of database storing the updated operational states.

10. A controller device comprising:
one or more network interfaces communicatively coupled to one or more devices of a virtual network; and
a processor configured to:
coordinate execution of a set of two or more related processes executed by respective devices in the virtual network, wherein coordinating comprises causing the respective devices to execute the set of two or more related processes that perform substantially similar operations;
receive a data set for the set of two or more related processes from the respective devices, wherein receiving the data set comprises receiving one or more operational states of the related processes from each of the respective devices, and wherein the operational states of the related processes each define one or more attributes of the corresponding processes and is associated with one or more respective partitions of a database on the controller device;
read a previous data set for the set of two or more related processes from the respective devices, wherein reading the previous data set comprises reading one or more previous operational states of the related processes from the respective devices;
process an update to the one or more previous operational states from the one or more received operational states of the related processes processing, by the controller device, an update to the one or more previous operational states from the one or more received operational states of the related processes, wherein processing the update includes determining that the one or more previous operational states of the related processes and the one or more received operational states are associated with the same one or more respective partitions of the database;
in response to processing the update, aggregate the one or more received operational states of the related processes with the one or more previous operational states of the related processes to form aggregated data of updated operational states; and
generate a message comprising data representing the aggregated data of updated operational states.

11. The device of claim 10, wherein the aggregated data of updated operational states comprises data for a User-Visible Entity (UVE), and wherein the two or more related processes are configured to generate at least some of the data for the UVE.

12. The device of claim 11, wherein the UVE is associated with the one or more respective partitions of the database on the controller device that store the previous operational states and updated operational sates for the associated UVE, and
wherein the one or more partitions of the database comprise:
one or more partition numbers that identify the one or more partitions of the database that store the previous operational states and the received operational states, and
one or more partition acquisition times of when the previous operational states and the received operational states were collected from the respective devices.

13. The device of claim 10, wherein the processor configured to aggregate the one or more received operational states of the related processes with the one or more previous operational states of the related processes to form aggregated data of updated operational states comprises configuration to:
store the aggregated data of updated operational states in a local database of the controller device; and
publish metadata representative of the aggregated data of updated operational states via a local bus of the controller device.

14. The device of claim 13, wherein the processor configured to store the aggregated data of updated operational states in the local database of the controller device comprises configuration to:
  store at least one of an aggregate partition, an aggregate key, and an aggregate value in the local database,
    wherein the aggregate partition comprises a grouping of one or more partition numbers of the updated operational states with the one or more partition acquisition times of the updated operational states for forming a partition number-partition acquisition time pair, wherein the partition numbers identify the one or more partitions of database that store the updated operational states,
    wherein the aggregate key comprises a grouping of one or more UVE keys associated with the partitions of database that store the updated operational states for forming a partition-UVE key pair, and
    wherein the aggregate value comprises a grouping of one or more UVE structure names of the updated operational states with one or more UVE structure contents of the updated operational states for forming a UVE name-content pair, wherein the one or more UVE structure contents comprises data of the updated operational states, and wherein the one or more UVE structure names comprises names to identify the UVE structure contents.

15. The device of claim 13, wherein the published metadata representative of the aggregated data of updated operational states comprises:
  one or more partition numbers that identify one or more partitions of database that store the updated operational states;
  one or more UVE keys associated with the one or more partitions of database that store the updated operational states; and
  one or more UVE structure names of the updated operational states, wherein the one or more UVE structure names comprises names to identify the UVE structure contents that comprise data of the updated operational states.

16. The device of claim 13, wherein the processor configured to store the aggregated data of updated operational states in the local database of the controller device comprises configuration to:
  store at least one of a partition index, a name index, and a type index,
    wherein the partition index comprises a grouping of one or more UVE keys of the updated operational states and the one or more UVE structure names of the updated operational states for each partition of database that stores the updated operational states,
    wherein the name index comprises a grouping of one or more UVE structure contents of the updated operational states and the one or more UVE keys of the updated operational states for each UVE structure name of the updated operational states, and
    wherein the type index comprises a grouping of the one or more UVE keys of the updated operational states with each UVE type of the updated operational states.

17. The device of claim 16, wherein the processor configured to generate the message comprising data representing the aggregated data of updated operational states comprises configuration to:
  filter the messages based on at least one of the partition index, the name index, and the type index.

18. The device of claim 10, wherein the processor configured to generate the message comprising some of the aggregated data of updated operational states comprises configuration to:
  read all instances of local aggregated metadata to read all instances of the aggregated data of updated operational states of local aggregate databases of the virtual network, wherein when two instances report a same partition number, the instance with a later partition acquisition time is used;
  generate a type field comprising one or more UVE structure names, wherein the UVE structure names comprise one or more names associated with the updated operational states;
  generate a value field comprising one or more UVE structure contents, wherein the UVE structure contents comprise data of the updated operational states; and
  generate a key field comprising one or more UVE keys, wherein the one or more UVE keys associate the updated operational states with partitions of database storing the updated operational states.

19. A computer-readable storage medium comprising instructions for causing at least one programmable processor of a computing device to:
  coordinate execution of a set of two or more related processes executed by respective devices in the virtual network, wherein coordinating comprises causing the respective devices to execute the set of two or more related processes that perform substantially similar operations;
  receive a data set for the set of two or more related processes from the respective devices, wherein receiving the data set comprises receiving one or more operational states of the related processes from each of the respective devices, and wherein the operational states of the related processes each define one or more attributes of the corresponding processes and is associated with one or more respective partitions of a database on the computing device;
  read a previous data set for the set of two or more related processes from the respective devices, wherein reading the previous data set comprises reading one or more previous operational states of the related processes from the respective devices;
  process an update to the one or more previous operational states from the one or more received operational states of the related processes;
  in response to processing the update, aggregate the one or more received operational states of the related processes with the one or more previous operational states of the related processes to form aggregated data of updated operational states, wherein processing the update includes determining that the one or more previous operational states of the related processes and the one or more received operational states are associated with the same one or more respective partitions of the database; and
  generate a message comprising data representing the aggregated data of updated operational states.

20. The computer-readable storage medium of claim 19, wherein to generate a message comprises the computing device to:
  read all instances of local aggregated metadata to read all instances of the aggregated data of updated operational states of local aggregate databases of the virtual network, wherein when two instances report a same partition number, the instance with a later partition acquisition time is used;

generate a type field comprising one or more UVE structure names, wherein the UVE structure names comprise one or more names associated with the updated operational states;

generate a value field comprising one or more UVE structure contents, wherein the UVE structure contents comprise data of the updated operational states; and generate a key field comprising one or more UVE keys, wherein the one or more UVE keys associate the updated operational states with partitions of database storing the updated operational states.

\* \* \* \* \*